United States Patent
Lee (10) Patent No.: US 7,088,028 B2
(45) Date of Patent: Aug. 8, 2006

(54) RING CAP FOR USE ON COMMUTATOR IN MINIATURE ELECTRIC MOTOR FOR ABSORBING ELECTRICAL NOISE/SOUND

(75) Inventor: Keung Lee, Shatin (HK)

(73) Assignee: Microplex NTP, Ltd., Tortola (VG)

( * ) Notice: Subject to any disclaimer, the term of this patent is extended or adjusted under 35 U.S.C. 154(b) by 0 days.

(21) Appl. No.: 10/934,779

(22) Filed: Aug. 27, 2004

(65) Prior Publication Data

US 2005/0264126 A1 Dec. 1, 2005

Related U.S. Application Data

(60) Provisional application No. 60/573,831, filed on May 25, 2004.

(51) Int. Cl.
*H02K 13/04* (2006.01)
(52) U.S. Cl. ............................... 310/234; 310/40 MM
(58) Field of Classification Search ................ 310/234, 310/233, 68 R, 239, 40 MM, 68 C
See application file for complete search history.

(56) References Cited

U.S. PATENT DOCUMENTS

| | | | |
|---|---|---|---|
| 4,329,605 A * | 5/1982 | Angi et al. ................ 310/68 R |
| 5,010,264 A | 4/1991 | Yamada et al. | |
| 5,196,750 A | 3/1993 | Strobl | |
| 5,294,852 A | 3/1994 | Straker | |
| 5,296,771 A * | 3/1994 | Sakuma et al. ............. 310/220 |
| 5,717,270 A * | 2/1998 | Lau et al. ................... 310/220 |
| 6,300,696 B1 * | 10/2001 | Wong ....................... 310/68 R |
| 6,528,922 B1 | 3/2003 | Lee | |
| 6,580,194 B1 * | 6/2003 | Mizutani et al. ............ 310/239 |
| 6,717,322 B1 | 4/2004 | Lee | |

FOREIGN PATENT DOCUMENTS

| | | |
|---|---|---|
| DE | 44 30 225 | 6/1995 |
| EP | 0 551 741 | 7/1993 |
| GB | 980957 | 1/1965 |
| GB | 2 389 242 | 12/2003 |
| JP | 2-148804 | 6/1990 |
| JP | 2003-37961 | 2/2003 |

* cited by examiner

*Primary Examiner*—Tran Nguyen
*Assistant Examiner*—Nguyen N. Hanh
(74) *Attorney, Agent, or Firm*—Nixon & Vanderhye P.C.

(57) ABSTRACT

A rotor assembly for an electric motor, including: a rotor shaft, an armature, wire windings and a commutator, wherein the rotor assembly further includes a ring cap directly connected with the commutator. The ring cap includes chip capacitors soldered on a printed circuit board through a Surface Mount Device (SMD) technique. The ring cap serves as a reservoir for absorption of any noise/sound generated from rotation of the commutator in a DC motor around its brushes. The invention enables compliance with current and future EMC requirements in, for example, the automotive industry.

18 Claims, 7 Drawing Sheets

Ring Cap. Type A
Motor Coil
Ceramic Capacitor 0.01–10 F

Fig. 8

Ring Cap. Type B
Printed Resistor 800 – 1.5K
Ceramic Capacitor 0.01–10 F

Fig. 9

Ring Cap. Type C
Varistor
Ceramic Capacitor 0.01–10 F

RING CAP FOR USE ON COMMUTATOR IN MINIATURE ELECTRIC MOTOR FOR ABSORBING ELECTRICAL NOISE/SOUND

CROSS-REFERENCES TO RELATED APPLICATIONS

This application claims the benefit of Provisional Application No. 60/573,831, filed May 25, 2004, the entire content of which is hereby incorporated by reference in this application.

FIELD OF THE INVENTION

The invention relates generally to miniature electric motors used in, for example, electrical devices for the automotive industry, motorized toys, audio and video equipment, hand tools and other electrical motor-driven devices. More particularly, the invention relates to a miniature, direct current (DC), electric motor having an improved design that reduces noise/sound generated from rotation of the commutator around its terminals. The invention provides an inexpensive and reliable motor assembly that enables compliance with, for example, current and future EMC requirements in the automotive industry, including EMI—Radiated Emission and EMI—Conducted Interference requirements.

BACKGROUND AND SUMMARY OF THE INVENTION

Typical miniature electric motors have a metallic cylindrical motor housing formed of mild steel or the like and defining a hollow tubular section and an integral bottom. One end of the motor housing is open to receive a brush base and cover plate, or an integral end cap, that encloses the open end of the motor housing. Within the housing are fixed a pair of opposite permanent magnets, each of which has an arc shape to match the inner wall of the housing. The magnets form between them a volume in the housing for a rotor. The rotor typically includes a cylindrical armature coaxially mounted on a rotor shaft. The rotor shaft extends through the opposite ends of the motor housing. Bearings may be used to rotatably support the rotor shaft in the ends of the housing. For example, the bottom of the motor housing may have an integral flange, into which a bearing can be press-fitted to support one end of the rotor shaft. The end cap may have a similar bearing structure. In this way, the rotor shaft is held in coaxial alignment with the motor housing.

The brush base or end cap supports a pair of brush arms which provide an electrical connection between an external electrical contact of the motor and the armature of the rotor. The brush arms are generally strips of copper having a first end fixed to the periphery of the brush base and an opposite, free end on which is mounted a brush. The brush arms are attached to opposite sides of the brush base. The brushes on the arms face each other at the axis of the motor. A PTC resistor may be incorporated in the end cap in order to protect against over-heating as a result of excessive current flow. When inserted in the housing, the brushes are in slidable contact with a commutator on the rotor shaft. The commutator provides an electrical contact between the wiring of the armature and the brushes. The armature may include any suitable number of wire windings, such as three windings. The external contacts of the brush arms provide direct electrical current (DC) through the brushes and the commutator to the windings in the armature. Electrical current flowing through the armature creates an alternating magnetic field within the housing that interacts with the magnetic field of the permanent magnets. This interaction of magnetic fields creates a force that rotates the rotor. This rotation drives the rotor shaft to provide a mechanical rotational output power source from the rotor. The rotor shaft extends through the bottom of the housing to provide a mechanical power output to drive a gear box or other device. Exemplary miniature electric motors and particular components thereof are shown in, for example, U.S. Pat. Nos. 6,528,922; 6,717,322; 5,294,852; 5,010,264, the disclosures of which are incorporated by reference herein.

Such miniature electric motors can be and are used in variety of applications, including, but not limited to, electrical appliances in the automotive industry and motorized toy vehicles. Miniature motors tend to be a relatively-low cost component of toys and other equipment. Accordingly, it is important that manufacturing costs and complexity for making these motors be minimized. It is also important for various applications incorporating miniature electric motors that the motors do not emit excessive electrical noise (i.e., transient current). The noise (and sound) is caused by sparks generated via commutation, due to, for example, poor contact, sudden change in voltage or back EMF (Electro Magnetic Force). In fact, certain industries, like the automotive industry, have EMC (Electro Magnetic Compatibility) requirements that these motors must satisfy in order to be approved for automotive applications. Such EMC requirements are getting more and more stringent as time goes on.

Figure 10:
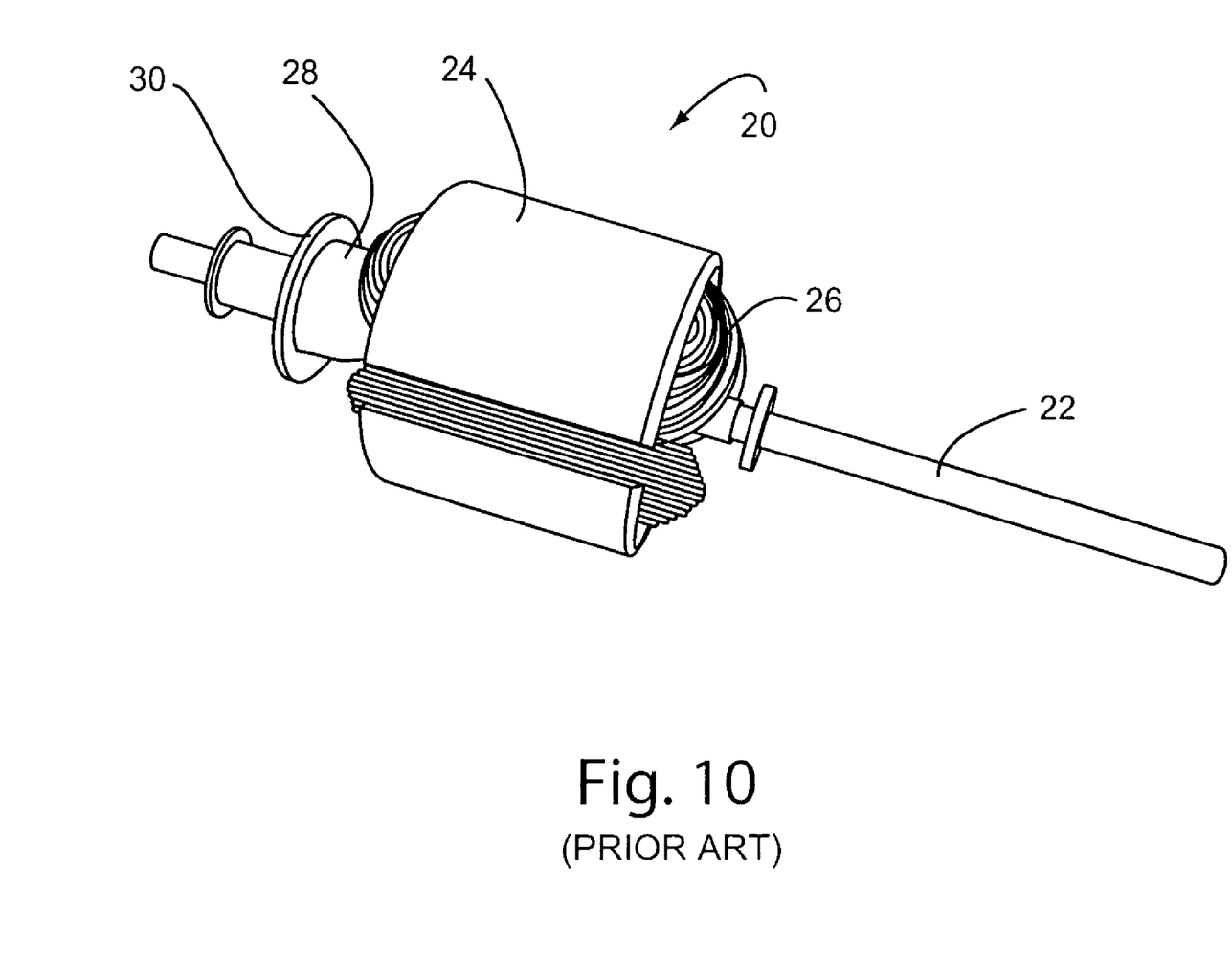
FIGS. 10 and 11 are photographs of prior art rotor assemblies incorporating a varistor on the commutator.
Figure 11:
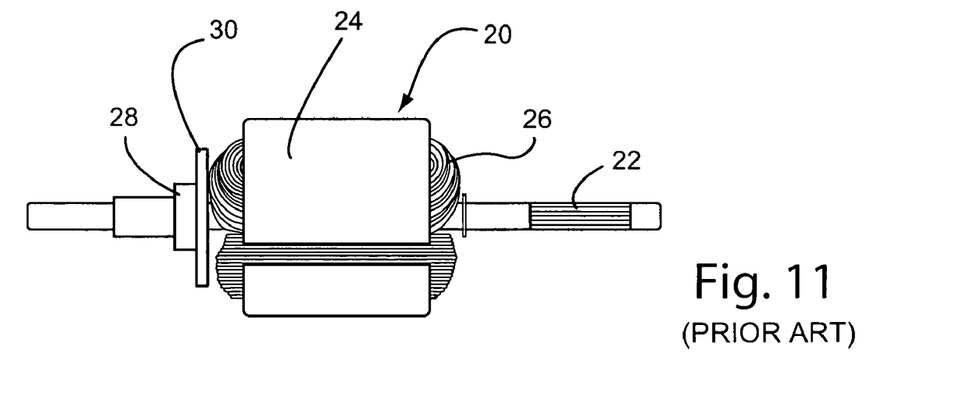

For example, over the last few decades in the automotive industry, such motors had to meet certain EMC requirements. One method employed for satisfying these EMC requirements in prior art DC motors was to provide a varistor mounted in contact with the commutator to absorb electrical noise from the commutator caused by rotation of the commutator around its terminals. FIGS. 10 and 11 show photographs of two prior art rotors 20 (one by Johnson Electric and one by Microplex NTP Ltd.), including a rotor shaft 22, armature 24, windings 26, commutator 28 and a varistor 30 mounted on the commutator for reducing electrical noise generated by the commutator. The varistor design provided satisfactory results and enabled the motors to meet EMC requirements in the automotive industry prior to 2003.

However, after 2003, the automotive industry established new and stricter EMC requirements that cover a full range EMI—Radiated Emission from 30–890 MHz. Moreover, with respect to EMI—Conducted Interference, the UHF (Ultra-High Frequency Range) was changed to control the radio band FM1 (76–90 MHz) and FM2 (87.5–108 MHz). The prior art designs of FIGS. 10 and 11 incorporating a bare varistor were incapable of meeting these new EMC requirements of the automotive industry. As a result, new methods are needed for satisfying these and similar EMC requirements in, for example, the automotive and any other industry that requires such EMC compliance.

Figure 12:
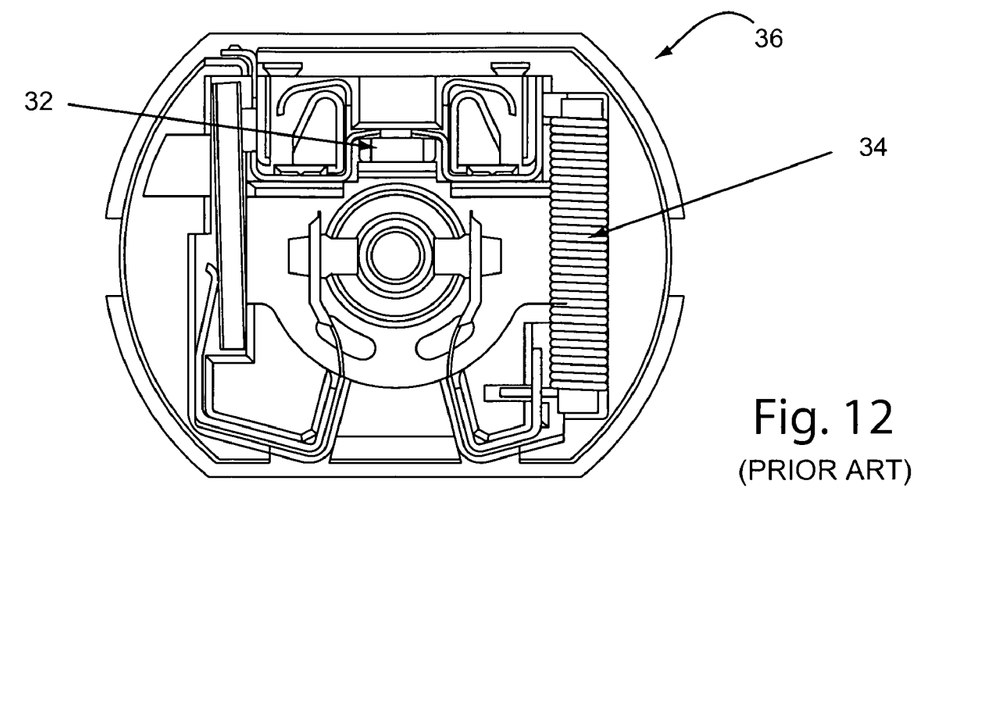
FIG. 12 is a photograph of a prior art end cap incorporating a chip capacitor and a choke coil.

In response to this need, one method that has been used to achieve compliance with the new automotive EMC requirements is shown in FIG. 12. FIG. 12 is photograph of an end cap 36 from an electric motor (by Johnson Electric) that includes a chip capacitor 32 and a choke coil 34 used to suppress the noise generated by the commutator to fulfill the new EMC requirements discussed above. Thus, the Johnson design shown in FIGS. 11 and 12 uses a combination of the varistor 30 on the commutator 28 and a chip capacitor and choke coil in the end cap to achieve the higher level of EMC compliance. More specifically, in the Johnson design, a chip capacitor and choke coil are used to form a "L-C" circuit to suppress the electrical noise generated from the commutation between the two carbon brushes and commutator. However, the choke coil is connected to the carbon brush holder while the chip capacitor is connected between the +ve and −ve terminals. This prior art method provides an indirect method of noise suppression using a simple "L-C" circuit. However, a disadvantage with this prior art technique is that the noise generated will have conducted interference in the brush holder, PTC, terminals and etc. Thus, this method only provides a noise suppression method. Another disadvantage with this prior technique is that it is relatively complex and expensive to produce. Accordingly, a need exists for a more effective and less costly solution to the problem of meeting new EMC requirements for electric motors in the automotive and other industries. The instant invention has been developed to meet this need.

Figure 13:
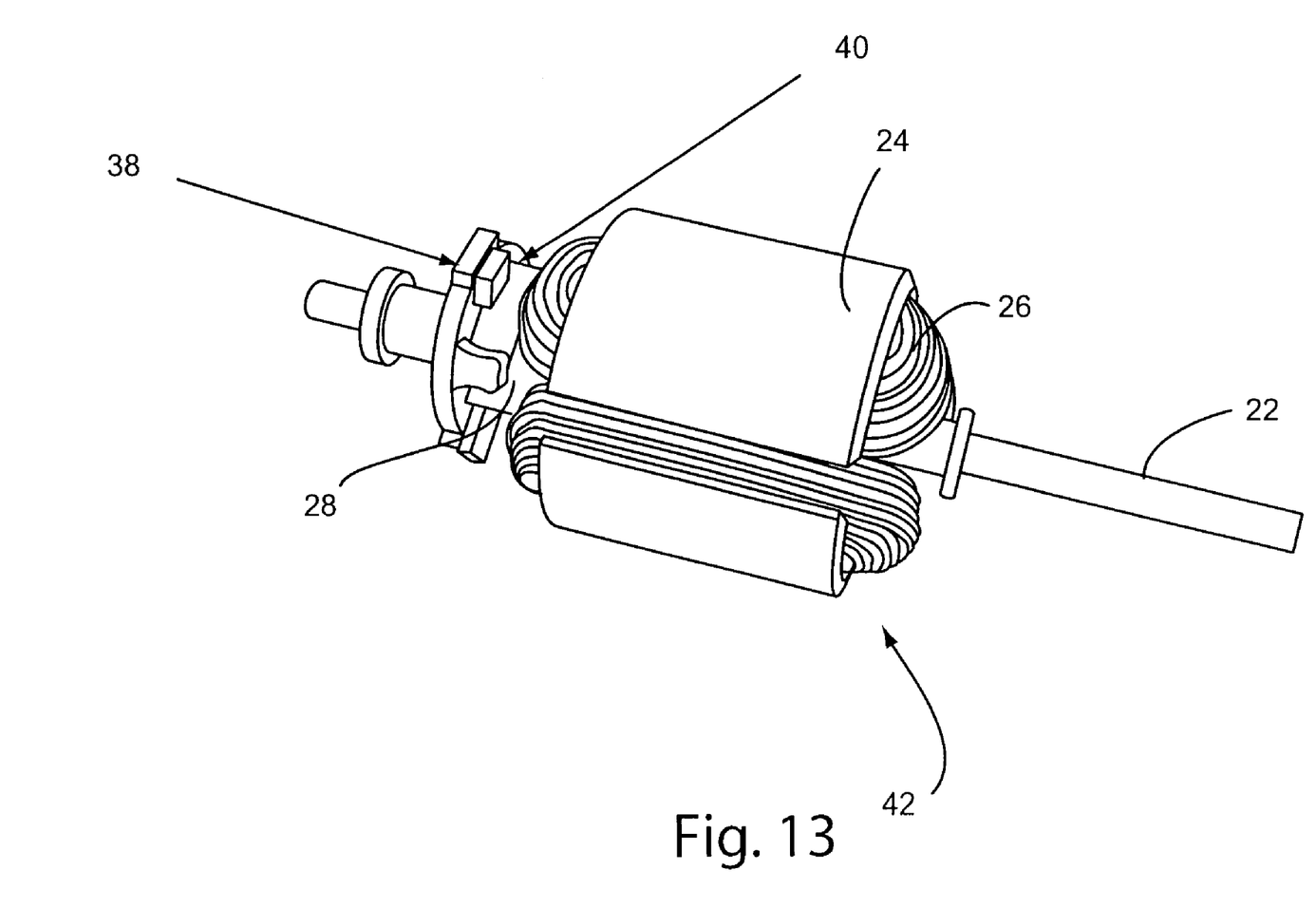
FIG. 13 is a photograph of a rotor assembly incorporating a ring cap in accordance with a preferred embodiment of the instant invention.

FIG. 13 shows a preferred embodiment of the instant invention. As shown in FIG. 13, the improved rotor design 42 for a DC motor constructed in accordance with the instant invention is similar to the exemplary prior art designs of FIGS. 11 and 12, to the extent that it includes a rotor shaft 22, armature 24, windings 26 and commutator 28. However, in accordance with the instant invention, a ring cap 38 is provided on the commutator for acting a reservoir for absorption of any noise/sound generated from rotation of the commutator around the terminals. In the preferred embodiment, the ring cap includes electric circuits comprised of ceramic chip capacitors soldered on a PCB (Printer Circuit Board), through the use of a Surface Mount Device (SMD) technique. The ring cap is directly connected to the commutator terminals.

The electric circuit of the ring cap 38 may include an L-C (Inductor-Capacitor (or Coil-Capacitor)) circuit (Type A—FIG. 7), an L-C-R circuit (Type B—FIG. 8), or L-C-Varistor circuit (Type C—FIG. 9), depending of the particular application in which the invention is employed. In each of the embodiments, the components are arranged in parallel. An odd number of coils/ceramic chip capacitors are preferably used for DC motor applications. For example, in the embodiment of FIG. 13, three (3) coils/ceramic chip capacitors are used. However, other odd numbers (i.e., 5, 7, . . . ) of coils etc. may also be used depending on the desired result. In terms of cost effectiveness, Type A is the cheapest to produce and Type C is the most expensive. However, in terms of sound reduction effectiveness, Type C is the best and Type B is the second best among the three types. Thus, in accordance with the invention, depending on the extent of noise/sound reduction desired for a given cost (which depends on the size of the reservoir required), one may select the right type of electric circuit for use in the ring cap 38.

While the embodiment of FIG. 13 has particular application to the automotive field where there exist strict EMC standards for controlling noise levels, the invention is not limited to automotive field and can be used in any suitable application. An important advantage of the instant invention is that it provides a direct method for absorption of sound/noise generated from a DC motor. In addition, the production costs can be kept low because the SMD technique can be used when making the ring cap. Further, the chip capacitor and choked coil in the end cap is no longer needed for EMC compliance. As a result, an improved motor design is provided by the instant invention that overcomes several significant disadvantages in the prior art.

BRIEF DESCRIPTION OF THE DRAWINGS

These and other features, objects and advantages of the instant invention will be better understood from the following detailed description of the preferred embodiments of the invention, including references to the appended drawings, in which.

DETAILED DESCRIPTION OF THE PREFERRED EMBODIMENT

Figure 1:
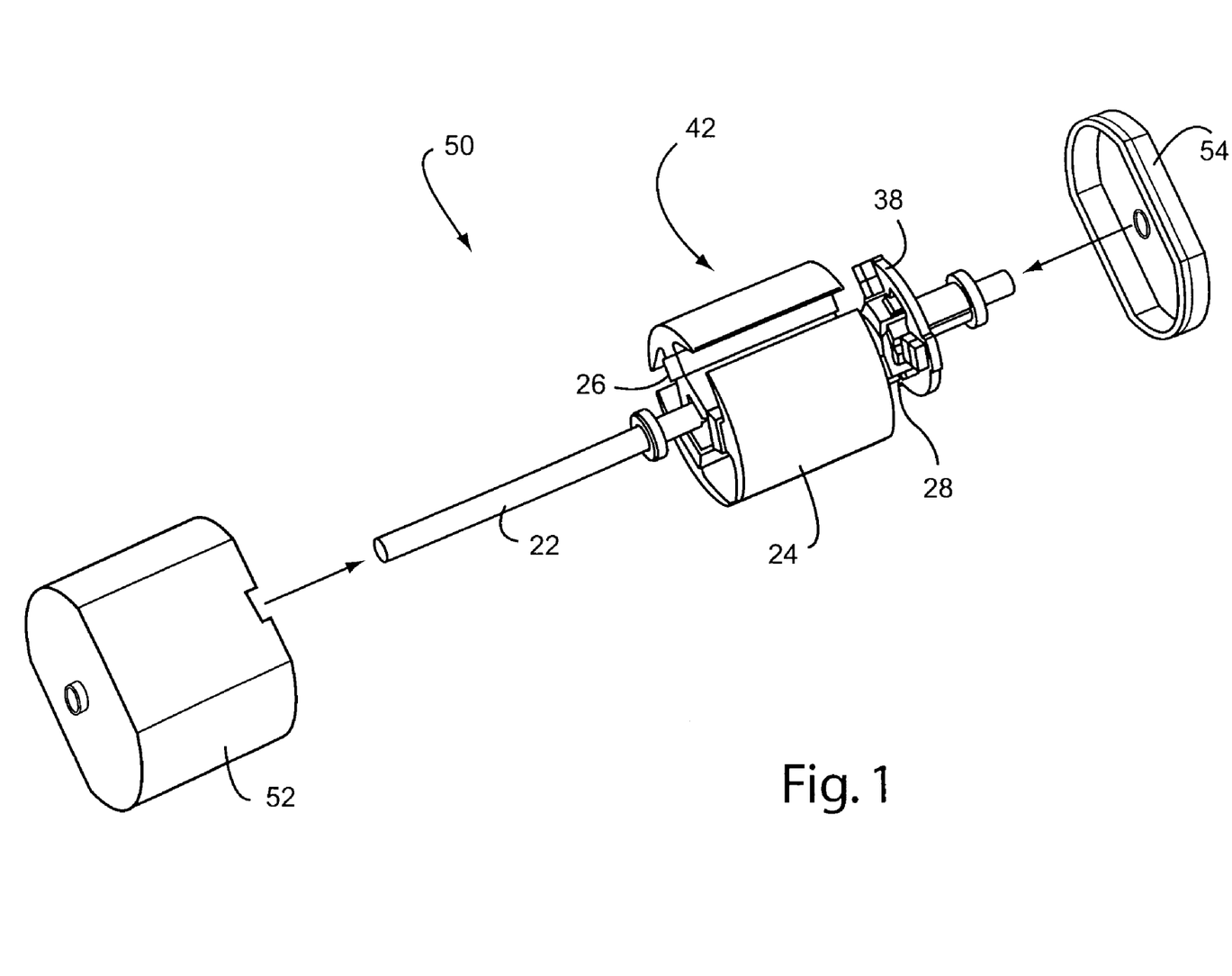
FIG. 1 is an exploded view of a rotor assembly, motor casing and end cap incorporating a ring cap for absorption of noise/sound in an accordance with a preferred embodiment of the instant invention.

Referring now to the drawings, in which like reference numerals designate similar parts throughout the various views, FIG. 1 shows an exploded view of a miniature electric motor including a preferred embodiment of the ring cap of the instant invention. The ring cap is designed to act as a reservoir for absorption of any noise/sound generated from rotation of the commutator around its brushes.

Figure 5:
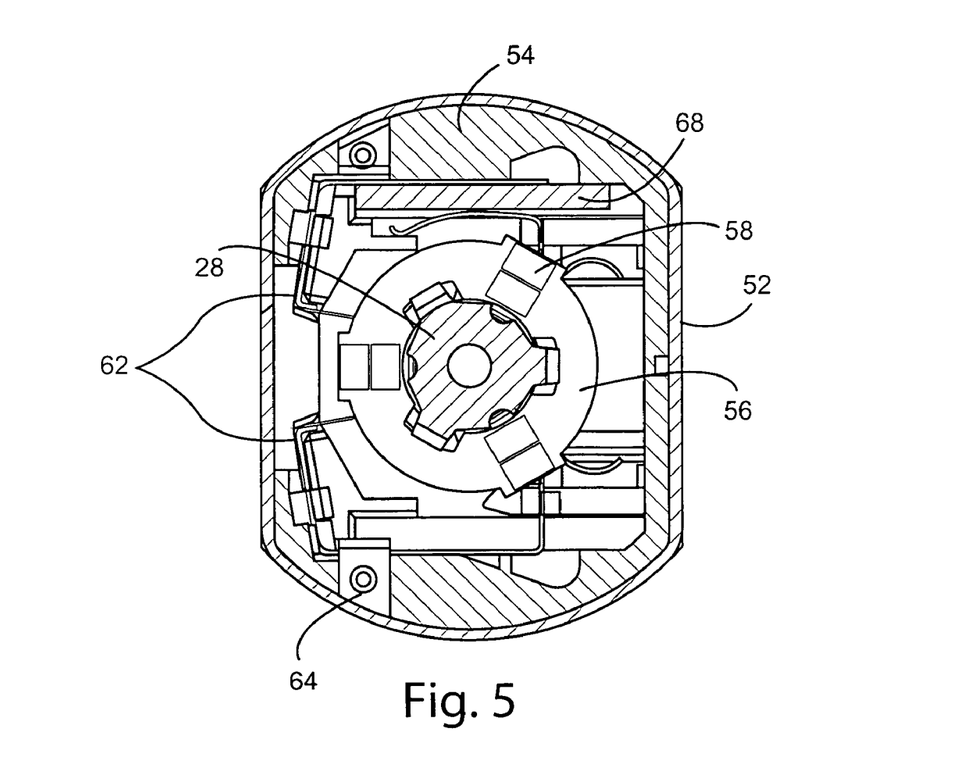
FIG. 5 is a sectional view of a assembled motor having a rotor employing the ring cap of the instant invention and showing the preferred structure of the end cap, including the terminals and PTC resistor therein.

As shown in FIG. 1, the motor 50 includes a motor housing 52 containing magnets (not shown) in a conventional manner, and end cap 54 constructed to enclose an open end of the motor housing 52, and a rotor assembly 42 containing a rotor shaft 22 that extends through respective openings in the motor housing 52 and the end cap 54. For simplicity, the end cap 54 is shown in FIG. 1 without the conventional brush configuration and related elements that are actually provided in the end cap (as shown in FIG. 5). Any suitable motor housing 52 and end cap 54 may be used. The rotor assembly 42 may have any suitable construction that typically employs a rotor shaft 22, armature 24, wire windings 26 and commutator 28. In accordance with the invention, a ring cap 38 is provided on the commutator 28 in order to directly absorb sound/noise generated by the DC motor during operation. The sound/noise is caused by sparks generated via commutation due to, for example, poor contact, intermittent commutation, a sudden change in voltage or back EMF (Electro Magnetic Force). In the preferred embodiment, the ring cap 38 is soldered directly onto the commutator 28 so that it will directly absorb sound/noise generated from commutation by providing an immediate alternate electric path. This direct connection reduces any sudden large change in potential difference and hence the back EMF that causes sparks, thereby reducing noise/sound. This construction provides an improved design as compared to, for example, the prior art Johnson design of FIGS. 11 and 12, wherein the choke coil 34 and chip capacitor 32 are located outside the rotor 20 where some of the sound/noise will inevitably have escaped/transmitted out before being absorbed.

Figure 2:
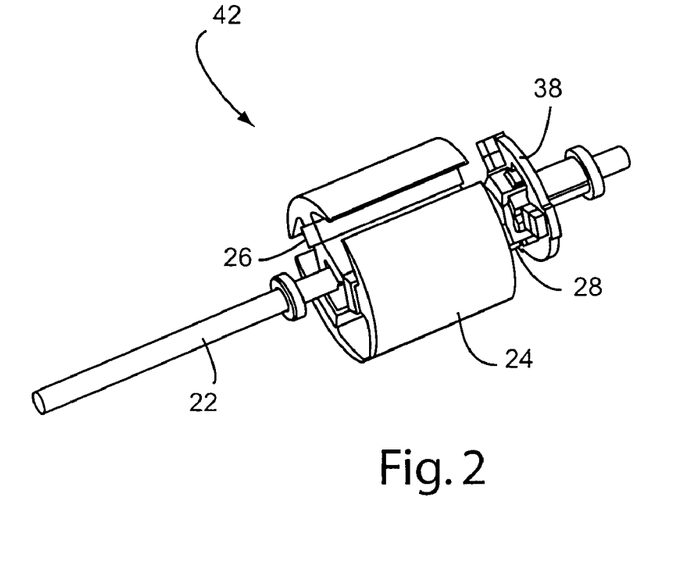
FIG. 2 is a perspective view of the rotor assembly of FIG. 1.
Figure 3:
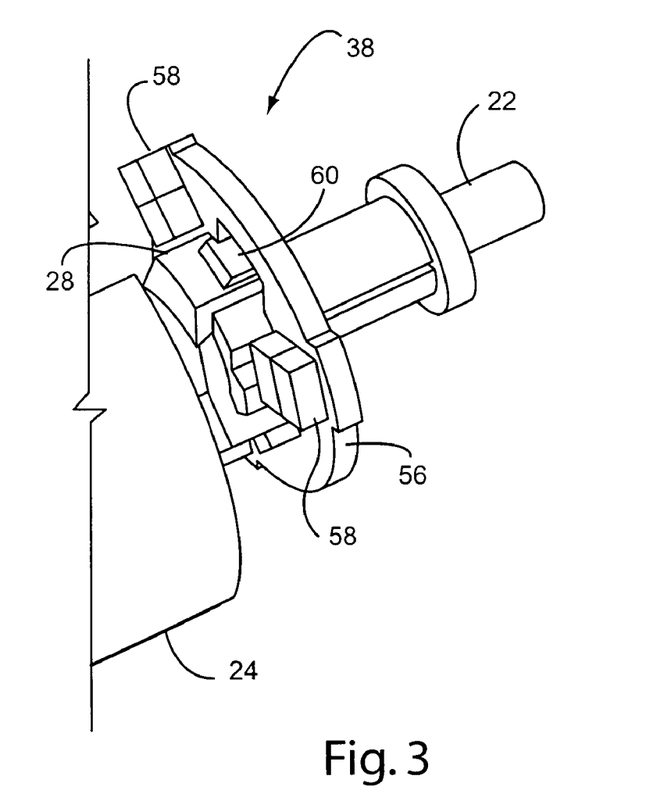
FIG. 3 is an enlarged, partial view of the end portion of the rotor assembly of FIG. 2 showing the ring cap of the invention mounted on the commutator.

FIG. 2 shows another view of the rotor assembly 42 including the ring cap 38 constructed and mounted on the commutator 28 in accordance with a preferred embodiment of the instant invention. FIG. 3 shows an enlarged view of one end of the rotor assembly of FIGS. 1 and 2 and illustrating more clearly the commutator 28 and ring cap 38. As can be seen most clearly in FIG. 3, the ring cap 38 is constructed to fit onto the commutator 28 such that the ring cap 38 makes electrical contact with the hooks 60 of the commutator 28. The ring cap 38 is preferably physically connected to the commutator by soldering the ring cap thereon. Thus, the ring cap 38 is directly connected to the commutator terminals. The respective windings/coils of the motor are also physically connected to the hooks 60 of the commutator by, for example, spot-welding the two ends of the lead wires of the windings/coils. Thus, the wires from the coils are spot welded to the hooks of the commutator before the ring cap is soldered to the commutator hooks.

In accordance with the invention, the ring cap 38 includes a printed circuit board (PCB) 56 having ceramic chip capacitors soldered thereon. An advantage of the invention is that the chip capacitors can be mounted on the PCB using a Surface Mount Device (SMD) technique, thereby simplifying production and reducing costs. The PCB 56 and chip capacitors 58 provide electric circuits that act as a reservoir for absorption of the noise/sound that is generated by rotation of the commutator 28 around its terminals. The chip capacitors 58 may be any suitable chip capacitor, like the type in the prior art Johnson motor (see FIG. 12). For example, the chip capacitors 58 may be multilayer surface mount chip capacitors that are constructed by screen printing alternative layers of internal metallic electrodes onto ceramic dielectric materials and firing into a concrete monolithic body, then completed by application of metal end terminations which are fired to permanently bond with the individual electrodes.

Figure 4:
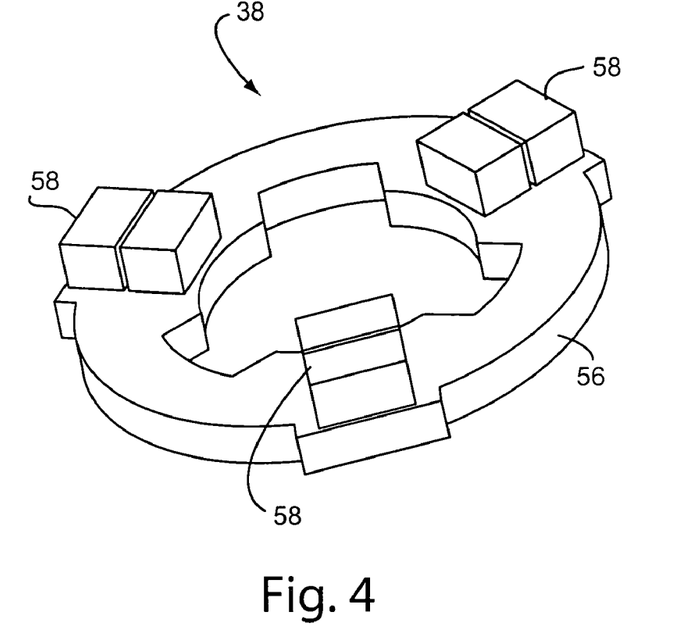
FIG. 4 is a perspective view of a preferred embodiment of the ring cap of the instant invention as used in the rotor assembly of FIG. 2.

FIG. 4 shows a view of a preferred embodiment of the ring cap 38 prior to being installed on the rotor assembly. In this embodiment, three chip capacitors 58 are mounted on the ring-shaped PCB 56. The inner circumference of the PCB is keyed as shown in FIG. 4 in order to properly fit on and make electrical contact with the commutator terminals. FIG. 5 shows a sectional view of a motor assembly including the ring cap 38 of the invention installed on the commutator 28. FIG. 5 also shows details of the end cap 54, including the terminals 62, PTC resistor 68 and ground 64, etc.

Figure 6:
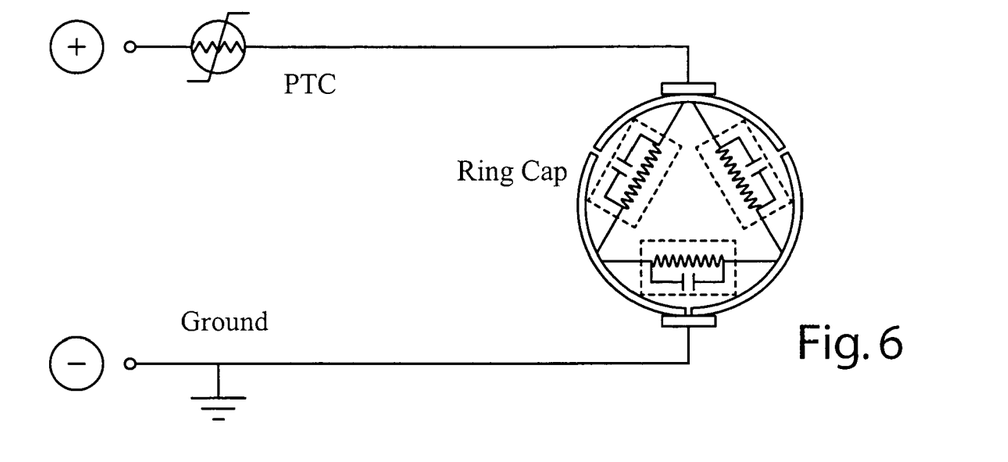
FIG. 6 is circuit diagram for the preferred embodiment of the ring cap of the instant invention.
Figure 7:
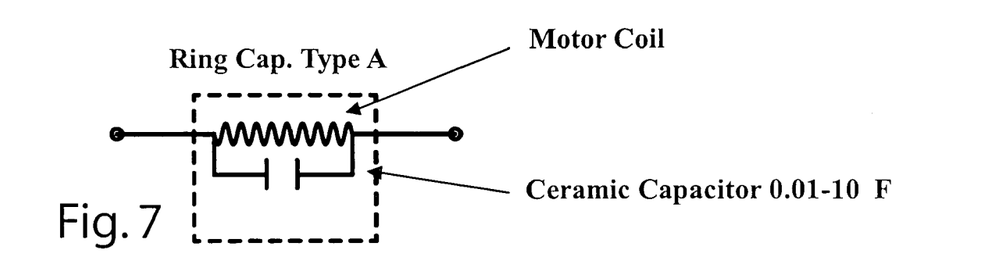
FIG. 7 is a circuit diagram illustrating a first embodiment (Type A) of the ring cap of the instant invention.
Figure 8:
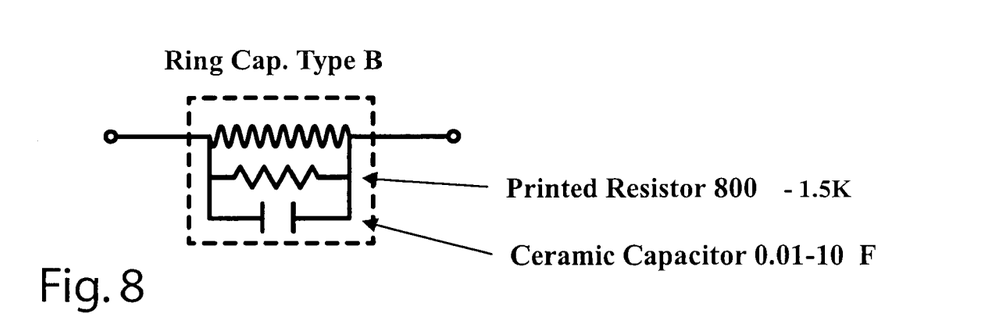
FIG. 8 is a circuit diagram illustrating a second embodiment (Type B) of the ring cap of the instant invention.
Figure 9:
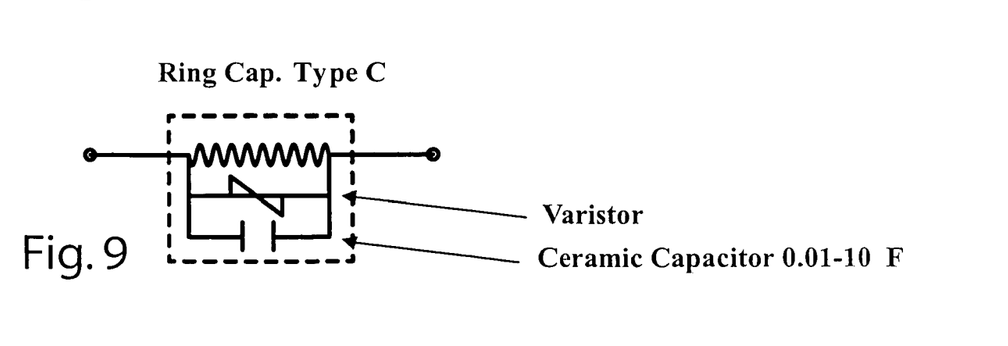
FIG. 9 is a circuit diagram illustrating a third embodiment (Type C) of the ring cap of the instant invention.

FIG. 6 illustrates the relevant circuitry of the ring cap in the preferred embodiment. The electric circuit of the ring cap 38 may include an L-C (Inductor-Capacitor (or Coil-Capacitor)) circuit (Type A), an L-C-R circuit (Type B), or L-C-Varistor circuit (Type C), depending of the particular application in which the invention is employed. Types A, B and C are shown in FIGS. 7–9, respectively. In each of the embodiments, the components are arranged in parallel. An odd number of coils/ceramic chip capacitors are preferably used for DC motor applications. For example, in the preferred embodiment shown in FIG. 6, three (3) coils/ceramic chip capacitors are used. However, other odd numbers (i.e., 5, 7, . . . ) of coils etc. may also be used depending on the desired result. In addition, even numbers (i.e., 4, 6, 8, . . . ) of coils may be used in other types of motors, such as, for example, stepping motors. In terms of cost effectiveness, Type A is the cheapest to produce and Type C is the most expensive. However, in terms of sound reduction effectiveness, Type C is the best and Type B is the second best among the three types. Thus, in accordance with the invention, depending on the extent of noise/sound reduction desired for a given cost (which depends on the size of the reservoir required), one may select the right type of electric circuit for use in the ring cap 38. As indicated in FIGS. 7–9, the chip capacitors may, for example, have 0.01–10 F. In addition, if one ceramic chip capacitor fails to provide the required capacitance, more than one chip capacitor of smaller capacitance may be arranged in parallel in the electric circuit to achieve the desired capacitance.

As explained above, each chip capacitor is soldered directly to the commutator terminals with the respective motor coil. The transient current (noise) generated by the commutation will flow (charge) directly to the chip capacitor without delay through the PCB circuit and any further connecting components (i.e., carbon brush holder, PTC, terminals etc.). In contrast to the invention, the varistor method shown in FIGS. 10 and 11, which is also directly connected to the commutator, only provides a current path for the transient current rather than absorbing the noise like the chip capacitors of the invention.

While the invention has particular application to the automotive field where there exist strict EMC standards for controlling noise levels, the invention is not limited to automotive field and can be used in any suitable application. An important advantage of the instant invention is that it provides a direct method for absorption of sound/noise generated from a DC motor. In addition, the production costs can be kept low because the SMD technique can be used when making the ring cap. Further, the chip capacitor and choked coil in the end cap are no longer needed for EMC compliance. As a result, an improved motor design is provided by the instant invention that overcomes several significant disadvantages in the prior art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor assembly for an electric motor, comprising: a rotor shaft, an armature with wire windings and a commutator, wherein the rotor assembly further includes a ring cap directly connected with the commutator, said ring cap being comprised of ceramic chip capacitors on a printed circuit board, wherein each of said wire windings are connected in parallel with a respective chip capacitor and a varistor of said ring cap to form Inductor-Varistor-Capacitor circuits.

2. A rotor assembly as in claim 1, wherein said chip capacitors are soldered on said printed circuit board through a surface mount device (SMD) technique.

3. A rotor assembly as in claim 2, wherein said rotor assembly is adapted for use in a miniaturized, direct current electric motor.

4. A rotor assembly as in claim 1, wherein an inner circumference of said ring cap is keyed for facilitating electrical contact between the commutator and the ring cap.

5. A rotor assembly as in claim 1, wherein an odd number of chip capacitors are provided on said ring cap.

6. A rotor assembly as in claim 5, wherein said odd number of chip capacitors equals the number of wire windings in said rotor assembly.

7. A rotor assembly as defined in claim 5, wherein said chip capacitors each have a capacitance of between 0.01 F to 10 F.

8. A rotor assembly as defined in claim 1, wherein said chip capacitors each have a capacitance of between 0.01 F to 10 F.

9. A rotor assembly for an electric motor, comprising: a rotor shaft, an armature with wire windings and a commutator, wherein the rotor assembly further includes a ring cap connected with the commutator, said ring cap including a ring-shaped printed circuit board shaped to fit on said commutator such that said rotor shaft extending through a center of said ring cap, and further wherein said ring cap includes a plurality of chip capacitors mounted on said printed circuit board, wherein each of said wire windings are connected in parallel with a respective chip capacitor and a varistor of said ring cap to form Inductor-Varistor-Capacitor circuits that act as a reservoir for absorption of electrical noise generated by rotation of said commutator within said electric motor.

10. A rotor assembly as in claim 9, wherein said chip capacitors are soldered on said printed circuit board through a surface mount device (SMD) technique.

11. A rotor assembly as in claim 10, wherein said rotor assembly is adapted for use in a miniaturized, direct current electric motor.

12. A rotor assembly as in claim 9, wherein an inner circumference of said ring cap is keyed for facilitating electrical contact between the commutator and the ring cap.

13. A rotor assembly as in claim 9, wherein an odd number of chip capacitors are provided on said ring cap.

14. A rotor assembly as in claim 13, wherein said odd number of chip capacitors equals the number of wire windings in said rotor assembly.

15. A rotor assembly as defined in claim 14, wherein said chip capacitors each have a capacitance of between 0.01 F to 10 F.

16. A rotor assembly as defined in claim 9, wherein said chip capacitors each have a capacitance of between 0.01 F to 10 F.

17. A rotor assembly as defined in claim 9, wherein said ring cap is directly connected to said commutator.

18. A rotor assembly as defined in claim 9, wherein said chip capacitors are ceramic chip capacitors.

* * * * *